United States Patent [19]

Shulda

[11] Patent Number: 4,913,815
[45] Date of Patent: Apr. 3, 1990

[54] CONCENTRIC DUAL BAG FILTER APPARATUS WITH CONTAINED MEDIA

[75] Inventor: David A. Shulda, Costa Mesa, Calif.

[73] Assignee: David A. Shulda Enterprises, Inc., Fountain Valley, Calif.

[21] Appl. No.: 17,963

[22] Filed: Feb. 24, 1987

[51] Int. Cl.⁴ ............................................. B01D 29/26
[52] U.S. Cl. ..................................... 210/287; 210/315; 210/317; 210/452; 55/372; 55/380; 55/485
[58] Field of Search ............... 210/287, 315, 316, 317, 210/444, 445, 448, 455, 457, 452; 55/372, 363, 364, 380, 485

[56] References Cited

U.S. PATENT DOCUMENTS

| | | | |
|---|---|---|---|
| 3,347,386 | 10/1967 | Kraissl, Jr. | 210/315 |
| 4,024,065 | 5/1977 | Morgan, Jr. | 210/315 |
| 4,081,379 | 3/1978 | Smith | 210/315 |
| 4,574,047 | 3/1986 | Rosaen | 210/315 |

Primary Examiner—Richard V. Fisher
Assistant Examiner—Wanda L. Millard
Attorney, Agent, or Firm—Leonard Tachner

[57] ABSTRACT

An improved fluid filtering apparatus having an inlet, an outlet, a sealed housing, an outer bag within the housing, an inner bag generally concentric to and suspended within the outer bag, a filtering medium retained inside the outer bag and outside the inner bag and a flow path which channels the fluid radially inward through the outer bag, the filtering medium and the inner bag to a channel in a perforated tube which supports the inner bag. The apparatus is designed to permit the fluid pressure to radially compress the filtering medium to substantially increase the filtering effect.

8 Claims, 2 Drawing Sheets

CONCENTRIC DUAL BAG FILTER APPARATUS WITH CONTAINED MEDIA

BACKGROUND OF TE INVENTION

1. FIELD OF THE INVENTION

The present invention relates generally to filtering apparatus and more particularly, to a new improved industrial-type filter which utilizes a unique inner and outer bag configuration for permitting implementation with a variety of solid particulate filtering media which are compressed by the fluid pressure to significantly enhance the filtering effect.

2. PRIOR ART

The most relevant prior art known to the applicant includes the following United States patents:

1,757,834 Haegler
2,101,555 Moore et al.
2,204,431 Moore et al.
2,622,414 Jaubert
3,258,899 Coffin
3,399,514 Reid
3,963,467 Rolschau
4,105,562 Kaplan et al;
4,289,630 Schmidt, Jr. et al.
4,398,931 Shevlin
4,481,022 Reier
4,525,184 Tassicker
4,581,047 Larsson U.S. Pat. No. 4,525,184 to Tassicker is directed to a vertically tiered particle filtering apparatus and includes a plurality of filter tubes. Gas enters the overall vessel through an inlet and passes through the filter tubes in order to leave a compartment. The gas is drawn into the tubes due to a pressure differential between the compartment and the interior of the tubes. As the particle laden gas passes through the filter tubes it is filtered and then passes through hood chambers and into a tube through openings for passage out of the vessel.

U.S. Pat. No. 3,258,899 to Coffin is directed to a system for fractionating gaseous mixtures. This does not use a plurality of bags, but provides for a vessel where the flow as seen in FIG. 4 passes through an adsorbent material and then through the perforations and into a central tube for passage external to the system.

U.S. Pat. No. 1,757,834 to Haegler is directed to a filter in which FIG. 2 shows a container having an upper end. Extending upwardly through the center of the container is a pipe. They provide for the filtering media and filter bags. The flow comes in from the top and passes through the filter bags, then out through the top of the filter bags and into the pipe. This provides for removal of the filtered gas.

U.S. Pat. No. 4,481,022 to Reier is directed to a bag assembly system and provides for a plurality of filter bags suspended within a filter housing. The filter bag assembly includes filter bags as shown in FIG. 2. It does provide for a plurality of filter bags within a bag housing, however, the flow passes upwardly into the bags and then outwardly therethrough for external displacement through a conduit.

None of the prior art known to the applicant discloses a filtering apparatus having an inner filter bag concentrically arranged within an outer filter bag, the outer filter bag being designed to receive any one of a number of possible filtering media, the flow of the fluid through the filter being from the outside of the outer bag to the inside of the inner bag, the design being facilitated by a perforated tube inner bag support structure. As a result, none of the prior art known to the applicant provides the high filtering efficiency of the present invention caused by fluid compression which compresses the filtering media radially inward toward the perforated tube in order to significantly increase the density of the filtering media. It would be advantageous to provide a filter having a universal filtering use resulting from a design which is capable of receiving virtually any one of a number of particulate material filtering media. None of the prior art known to the applicant combines the feature of radial fluid compression of the filtering media with virtually unlimited filtering applications based upon the ability to select an unlimited number of filter media ingredients. Thus, there has been a long-felt need for a filtering apparatus particularly suited for industrial applications which has an extremely high filtering efficiency, which is relatively inexpensive to produce and which has a virtually unlimited number of filtering applications for filtering fluids depending upon the user's selection of filtering media.

SUMMARY OF THE INVENTION

The present invention solves the aforementioned long-felt need by providing an improved filtering apparatus primarily adapted for industrial applications the improvement residing primarily in the use of an inner bag support which permits the use of two bags, an outer bag and an inner bag, the outer bag enclosing a selected filtering media, the inner bag enclosing an elongated perforated tube. The inlet to the filtering apparatus of the present invention is preferably provided at or near the bottom of the filter whereby the incoming fluid is diffused around the radial periphery of the outer bag for flow through the outer bag, through the inner bag, through the selected filtering media and through the inner bag into the perforated tube where it exits through an outlet preferably positioned adjacent the top of the filtering apparatus. The unique design of the present invention permits a high efficiency filtering effect due to the compression of the filtering media between the bags in response to the pressure of the incoming fluid. The filtering effect is also made more efficient by the use of two bags, namely, an outer bag that holds the filtering media and an inner bag that provides an inner radial support for the filtering media and which surrounds an elongated perforated tube that provides the outlet path for the filtered fluid. The filtering efficiency is further enhanced by providing a design which permits the user to select any one of a number of different possible filtering media depending upon the nature of the fluid and the extraneous material that is to be filtered from the fluid. Furthermore, by permitting the user to select from virtually an unlimited number of possible filtering media, the design of the present invention makes the apparatus applicable to an unlimited number of filtering tasks, thereby rendering the device more universal without requiring specialty designs for unique applications and thus substantially reducing the cost of manufacture.

OBJECTS OF THE INVENTION

It is therefore a principal object of the present invention to provide an improved filtering apparatus primarily adapted for industrial applications and which substantially reduces or entirely overcomes the noted deficiencies of the prior art.

It is an additional object of the present invention to provide an improved filtering apparatus particularly suited for industrial applications and having an improved filtering efficiency resulting from a bag within a bag design which increases the amount of filtering performed by the apparatus.

It is still an additional object of the present invention to provide an improved filtering apparatus particularly suited for industrial applications and having a uniquely designed configuration which permits the pressure of the incoming fluid to compress a filtering media within an outer bag to thereby increase the efficiency of the filtering of the apparatus.

It is still an additional object of the present invention to provide an improved filtering apparatus particularly suited for industrial applications and having a unique flow characteristic wherein the fluid enters from the bottom and is diffused radially to enter an outer bag around a radial periphery thereof for compressing a selected particulate media contained within the outer bag and an inner bag, the inner bag being supported by an elongated perforated tube which permits passage of the filtered fluid up toward the top of the filtering apparatus where it exits.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
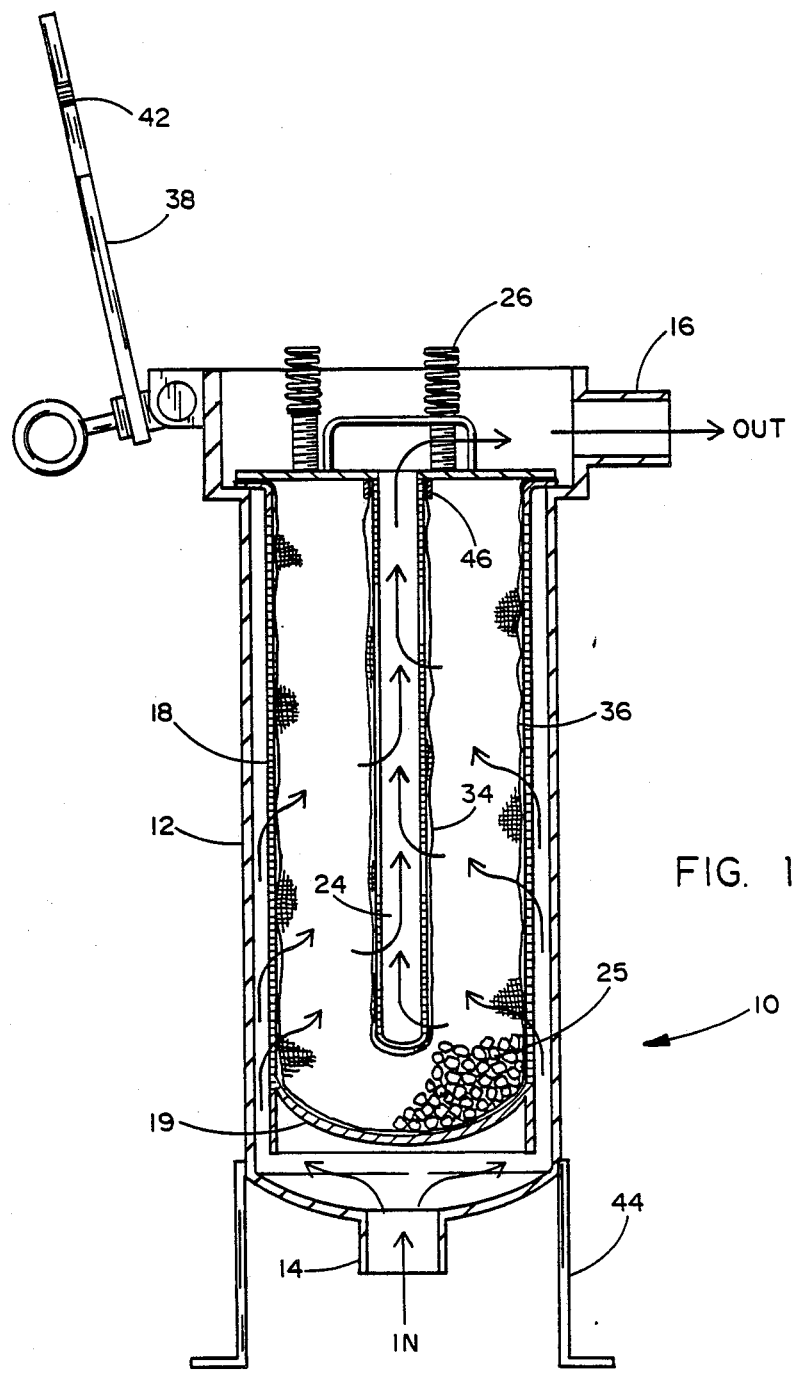
FIG. 1 is a cross-sectional view of the filtering apparatus of the present invention.

Referring first to FIG. 1 it will be seen that the improved filtering apparatus 10 of the present invention comprises a housing 12 having an inlet 14 and an outlet 16. The inlet 14 is designed for receiving the contaminated fluid to be filtered by the present invention and the outlet 16 is designed to provide an exit port for the filtered fluid after it has been processed by the present invention.

The housing 12 is of a generally cylindrical shape and is adapted to receive a perforated bag support 18 having a solid base 19 and perforated side walls. The diameter of the perforated bag support 18 is slightly less than the inner diameter of the housing 12 thereby assuring the existence of a flow path in the radial periphery around the inner surface of housing 12. This path assures that means are provided for permitting the flow of the diffused input fluid entering at inlet 14 so that the fluid may flow up through the housing 12 and radially inward through the perforations in the perforated bag support 18.

Figure 2:
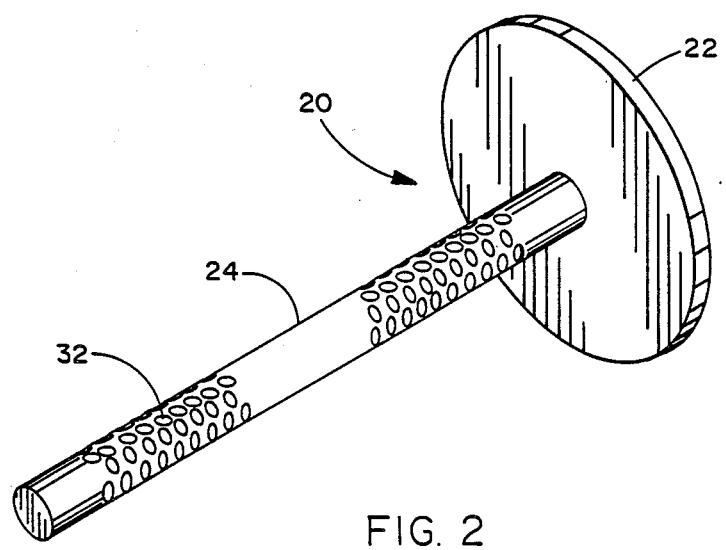
FIG. 2 is a first isometric view of the inner bag support of the present invention.

Filtering apparatus 10 also provides an outer bag 36 and an inner bag 34. Outer bag 36 nests within the inner surface of perforated bag support 18 while inner bag 34 encloses and is secured to an elongated tube 24 of an inner bag support 20. Inner bag support 20 may be more fully understood by referring to FIGS. 2 and 3 wherein it is shown that support 20 comprises a plate 22 from which the perforated tube 24 extends. The majority of the central portion of perforated tube 24 is provided with a plurality of equally spaced perforations 32 designed to permit easy flow of the filtered fluid into the tube 24 for exiting the filtering assembly as will be hereinafter more fully understood.

Figure 3:
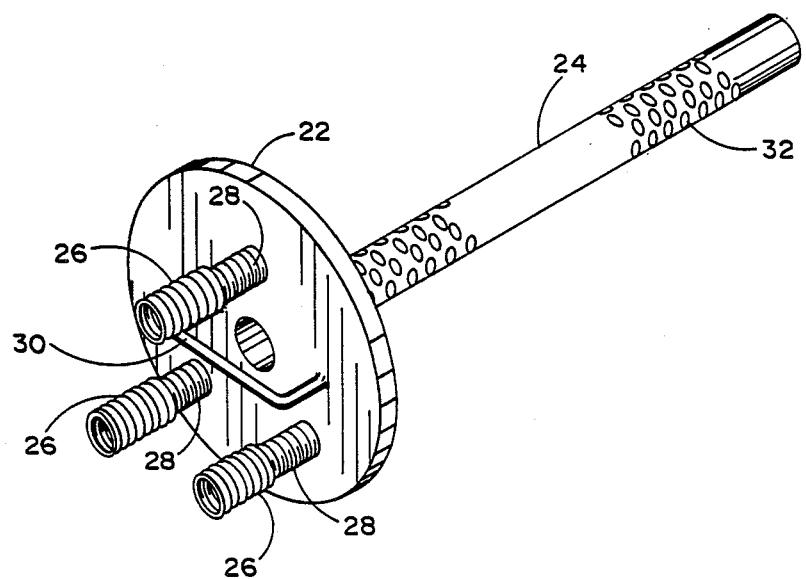
FIG. 3 is a second isometric view of the inner bag support of the present invention.

As seen best in FIG. 3 the upper portion or surface of plate 22 is provided with a plurality of springs 26 each attached to a corresponding threaded member 28. It will be seen hereinafter that springs 26 and threaded members 28 provide a means for compressively securing the inner bag support 20 within the housing 12. A handle 30 is also provided to facilitate easy removal of the inner bag support for bag replacement and other maintenance operations. The inner bag 34 is of an elongated generally cylindrical configuration, closed at the bottom and open at the top. The top is secured to the perforated tube 24 by means of a clamp 46 which may for example, be a common hose-type clamp. The spacing between the inner bag 34 and outer bag 36 provides an elongated annular region which is adapted to receive a filtering medium 25.

The filtering medium may be any one of different available filtering compounds including carbon compounds, diatomaceous earth, resins, diamars, high quality oil absorbent materials and so forth, depending upon the particular application to which the filtering apparatus 10 is subjected. The material and characteristics of the inner and outer bags 34 and 36, respectively, may also be selected from a variety of possible choices well-known in the filtering industry. By way of example, such bags may be formed from a combination of felt and polyester, felt and polypropylene, or other such materials that tend to be closely knit for trapping and filtering solid particulate materials. Typically, bags 34 and 36 are between 1/32 and 1/4 inches in thickness although they may be thicker depending upon the application. The inner bag may have a typical mesh of 1 micron and the outer bag will have a typical mesh of 25 microns. However, the specific characteristics of the bags are readily varied simply by selecting alternative materials and material characteristics and therefore the bag properties per se are not to be deemed limiting of the present invention.

Figure 4:
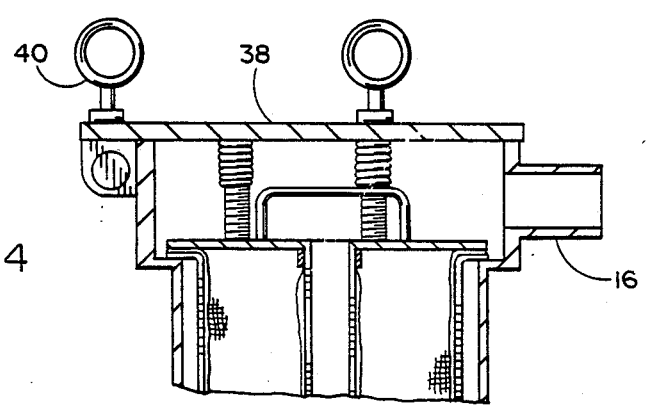
FIG. 4 is a partial view of the upper portion of the present invention illustrating the manner in which the apparatus is closed and sealed during normal use.

The inner bag 20 is secured within the housing 12 by means of a hinged cover 38 which may be secured in place for compressively engaging the springs 26. When secured in place, the cover 28 is affixed by a plurality of closure members 40 within a corresponding plurality of recessed slots 42. The covered configuration with the cover 38 engaging the springs 26, is shown in FIG. 4. The housing 12 may be provided with a plurality of supports such as housing supports 44 as shown in FIG. 1 for providing clearance between the inlet 14 and the underlying support surface.

The various arrows shown in FIG. 1 generally illustrate the flow path for the fluid being filtered through the apparatus of the present invention. More specifically, it will be seen that the incoming fluid, entering through inlet 14, is diffused around the solid base 19 of the perforated bag support 18. Fluid then flows up the path provided between the inner surface of the housing 12 and the perforated bag support where it enters bag support 18 and the outer bag 36 in a substantially radial direction. The fluid then passes through the filter medium 25 which will be compressed by the pressure fluid around the inner periphery of the housing 12. Fluid eventually makes its way to the inner bag 34 where it passes through the inner bag and enters the perforated tube 24 through perforations 32. The fluid then continues upwardly within the perforated tube 24 until it reaches the top surface of the plate 22 of the inner bag support 20 where it exits at the outlet 16.

It will now be understood that what has been disclosed herein comprises a novel improved filtering apparatus having a unique dual bag configuration designed for providing radially inward directed flow through a particulate material filtering medium which may be selected from virtually any number of such media depending upon the nature of the filtering task. The dual bag and particulate media configuration of the present invention are made possible primarily by a unique inner bag support which provides an elongated perforated tube supporting an inner bag which in turn supports the inner radial periphery of the filter medium contained between the inner and outer bags. The filter medium is subjected to intense fluid pressure which tends to compress the medium and thereby increase the efficiency of the filtering effect. In addition, all of the fluid flows through at least the two bag surfaces in addition to the filtering medium thereby also increasing the filtering effect. Because the characteristics of the filtering bags as well as the characteristics of the selected filtering medium, may be easily modified by merely using alternative materials to provide these functions, the present invention has universal application to virtually any fluid filtering task including, for example, separating oil from water and separating particulate material from virtually any fluid for recycling such fluid.

Those having skill in the art to which the present invention pertains will now, as a result of the teaching herein, perceive various modifications and additions which may be made to the invention. By way of example, it will be apparent that various alternative geometrical configurations as well as alternative means for supporting an inner bag relative to an outer bag, may be provided. However, it will be understood that all such modifications and additions are deemed to be within the scope of the invention which is to be limited only by the claims appended hereto.

I claim:

1. In a fluid filtering apparatus of the type having an inlet for unfiltered fluid, an outlet for filtered fluid and a filtering medium between the inlet and the outlet, the filtering medium being contained within a sealed housing; the improvement comprising:
    an outer bag within said housing;
    an inner bag generally concentric to and suspended within said outer bag, said filtering medium being retained between said outer and inner bags;
    first means providing a fluid path between said housing and said outer bag and in fluid communication with said inlet; and
    second means providing a fluid path within said inner bag and in fluid communication with said outlet;
    whereby fluid from said inlet passes radially into said outer bag, through said filtering medium, into said inner bag and exits at said outlet.

2. The improvement recited in claim 1 wherein said first means comprises a perforated basket that is smaller than but has the same general shape as the interior of said housing, and which has a diffusing surface adjacent said inlet for directing fluid toward said outer bag.

3. The improvement recited in claim 1 wherein said second means comprises an elongated hollow tube having perforations along at least a portion of its length, said perforations providing fluid access to an elongated channel within said tube, said channel terminating at one end in an opening adjacent said outlet, and wherein said inner bag is secured to said tube.

4. The improvement recited in claim 1 wherein said housing, said outer bag and said inner bag are of a generally cylindrical shape.

5. The improvement recited in claim 3 wherein said elongated tube is affixed to a planar plate having an aperture, said plate aperture being formed in the plane of said channel opening.

6. In a fluid filtering apparatus of the type having an inlet for unfiltered fluid, an outlet for filtered fluid and a filtering medium between the inlet and the outlet, the filtering medium being contained within a sealed housing; the improvement comprising:
    an outer bag within said housing;
    an inner bag generally concentric to and suspended within said outer bag, said filtering medium being retained between said outer and inner bags;
    a perforated basket that is smaller than but has the same general shape as the interior of said housing and which has a diffusing surface adjacent said inlet for directing fluid toward said outer bag; and
    an elongated hollow tube having perforations along at least a portion of its length, said perforations providing fluid access to an elongated channel within said tube, said channel terminating at one end in an opening adjacent said outlet, said inner bag being secured to said tube;
    whereby fluid from said inlet passes radially into said outer bag, through said filtering medium, into said inner bag and exits at said outlet.

7. The improvement recited in claim 6 wherein said housing, said outer bag and said inner bag are of a generally cylindrical shape.

8. The improvement recited in claim 6 wherein said elongated tube is affixed to a planar plate having an aperture, said plate aperture being formed in the plane of said channel opening.

* * * * *